(12) United States Patent
Day

(10) Patent No.: US 10,681,313 B1
(45) Date of Patent: Jun. 9, 2020

(54) HOME MONITORING CAMERA FEATURING INTELLIGENT PERSONAL AUDIO ASSISTANT, SMART ZOOM AND FACE RECOGNITION FEATURES

(71) Applicant: Ambarella International LP, Santa Clara, CA (US)

(72) Inventor: Christopher N. Day, Los Gatos, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/145,501

(22) Filed: Sep. 28, 2018

(51) Int. Cl.
| H04N 7/18 | (2006.01) |
| H04N 7/01 | (2006.01) |
| G10L 17/00 | (2013.01) |
| G06K 9/00 | (2006.01) |
| G06T 3/40 | (2006.01) |
| H04N 5/232 | (2006.01) |
| G06T 5/00 | (2006.01) |

(52) U.S. Cl.
CPC ......... H04N 7/181 (2013.01); G06K 9/00288 (2013.01); G10L 17/005 (2013.01); H04N 7/0117 (2013.01); G06T 3/4038 (2013.01); G06T 5/006 (2013.01); H04N 5/23296 (2013.01)

(58) Field of Classification Search
CPC .. H04N 7/181; H04N 7/0117; H04N 5/23296; G06K 9/00288; G10L 17/005; G06T 3/4038; G06T 5/006
USPC ........................................................ 348/156
See application file for complete search history.

(56) References Cited

U.S. PATENT DOCUMENTS

| 2002/0101505 A1* | 8/2002 | Gutta | H04N 7/15 348/14.07 |
| 2007/0040903 A1* | 2/2007 | Kawaguchi | H04N 7/147 348/14.08 |
| 2012/0113281 A1* | 5/2012 | Kim | H04N 5/23219 348/220.1 |
| 2013/0227678 A1* | 8/2013 | Kang | G06F 21/32 726/19 |

(Continued)

OTHER PUBLICATIONS

Moren, "Alexa vs Google Assistant vs Siri: Google Widens Its Lead", https://www.tomsguide.com/us/alexa-vs-siri-vs-google,review-4772.html, Jun. 4, 2018, pp. 1-13.

*Primary Examiner* — Michael Lee
(74) *Attorney, Agent, or Firm* — Ambarella International LP

(57) ABSTRACT

An apparatus includes a video capture device, an audio capture device and a processor. The video capture device may be configured to generate a plurality of video frames. The audio capture device may be configured to capture audio. The processor may be configured to analyze the audio to determine a direction of a source of the audio, select a window of interest for the video frames corresponding to the direction of the source of the audio, perform video operations to generate high resolution images of the window of interest, perform facial recognition operations on the high resolution images and determine an identity of the source of the audio in response to the facial recognition operations. The window of interest may have an area less than a total area of the video frames. The identity of the source of the audio may determine permissions for accessing features of the apparatus.

17 Claims, 10 Drawing Sheets

(56) References Cited

U.S. PATENT DOCUMENTS

2014/0006026 A1* 1/2014 Lamb ................ G10L 17/00
704/246

* cited by examiner

US 10,681,313 B1

HOME MONITORING CAMERA FEATURING INTELLIGENT PERSONAL AUDIO ASSISTANT, SMART ZOOM AND FACE RECOGNITION FEATURES

FIELD OF THE INVENTION

The invention relates to video processing generally and, more particularly, to a method and/or apparatus for implementing a home monitoring camera featuring intelligent personal audio assistant, smart zoom and face recognition features.

BACKGROUND

Home monitoring cameras with an integrated intelligent personal audio assistant are becoming more popular. The integrated intelligent personal audio assistant has the capability of allowing user instructions to be interpreted via verbal commands. However, as with many internet-connected devices, personal audio assistant devices, often lack in security. For example, keywords are often used to initiate a verbal command. If an unauthorized user is able to speak the keyword the personal audio assistant device might still perform a command (i.e., a commercial playing on a TV set has been used to cause a personal audio assistant to remotely cause personal audio assistants to perform functions).

One form of security that can be added to an intelligent personal audio assistant is permissions. If only particular users have permissions to initiate functions, then unauthorized use can be prevented. The problem is identifying the person speaking to the personal audio assistant. Video can be used to distinguish users. However, if the camera has a wide field of view there may be a limited image resolution within a particular viewing area. The camera must also select which person is talking in those situations where multiple people are present.

It would be desirable to implement a home monitoring camera featuring intelligent personal audio assistant, smart zoom and face recognition features.

SUMMARY

The invention concerns an apparatus includes a video capture device, an audio capture device and a processor. The video capture device may be configured to generate a plurality of video frames. The audio capture device may be configured to capture audio. The processor may be configured to analyze the audio to determine a direction of a source of the audio, select a window of interest for the video frames corresponding to the direction of the source of the audio, perform video operations to generate high resolution images of the window of interest, perform facial recognition operations on the high resolution images and determine an identity of the source of the audio in response to the facial recognition operations. The window of interest may have an area less than a total area of the video frames. The identity of the source of the audio may determine permissions for accessing features of the apparatus.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a home monitoring camera featuring intelligent personal audio assistant that may (i) implement a smart zoom, (ii) perform face recognition, (iii) determine permissions of a speaker, (iv) identify a speaker in a video frame, (v) distinguish a speaker from multiple faces in a video frame, (vi) generate a high resolution image from a wide field of view camera, (vii) enable/disable particular features based on permissions and/or (viii) be implemented as one or more integrated circuits.

Embodiments of the invention may comprise security features in a camera where a user (e.g., a speaker) may be identified by facial recognition. Different users may have different rights (e.g., permissions). The permissions may be used to determine which options and/or features may be enabled. Some users may not be able to enable or disable certain camera features. In one example, a user may be blocked from making on-line purchases.

Figure 1:
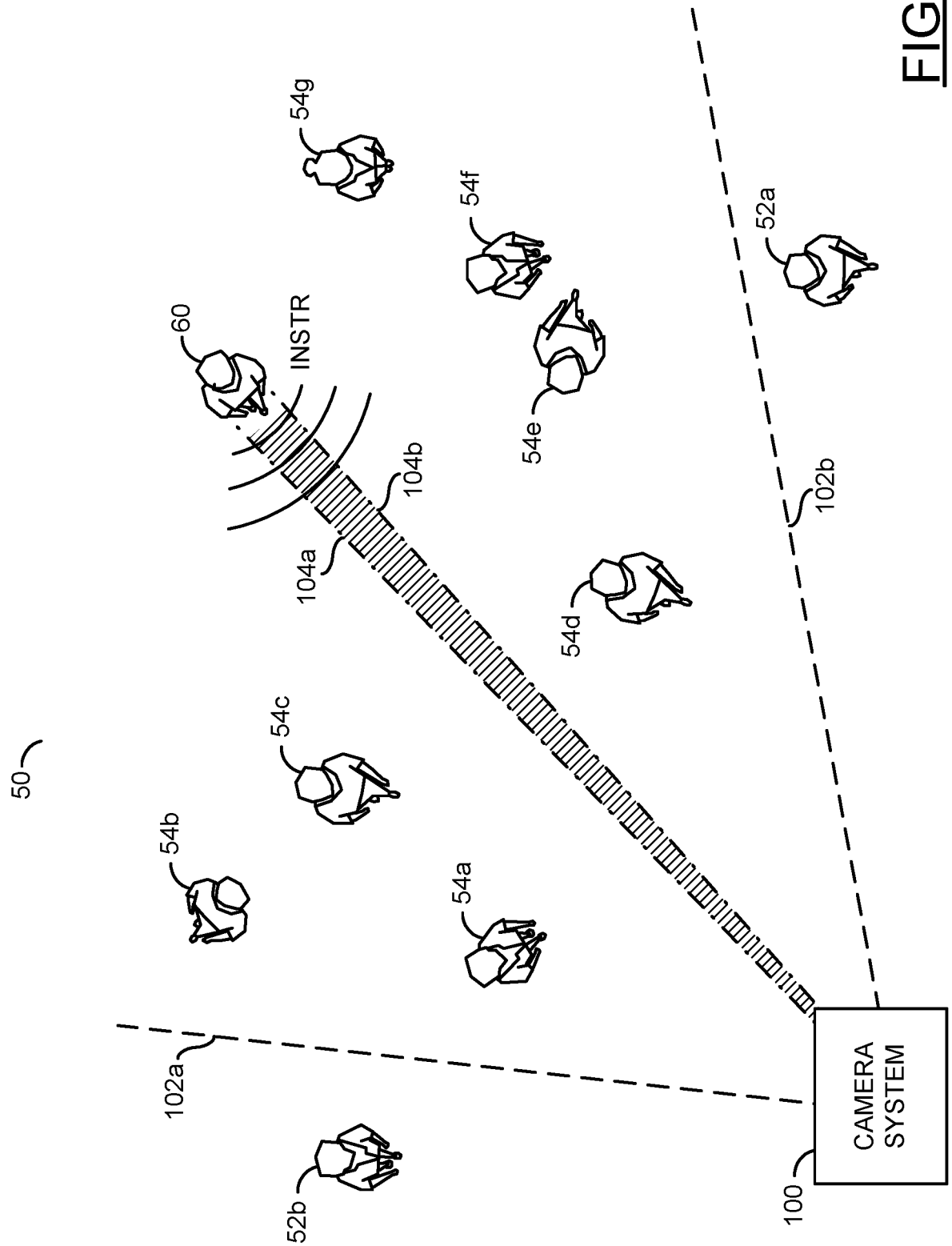
FIG. 1 is a diagram illustrating an example embodiment of the invention.

Referring to FIG. 1, a diagram illustrating an example embodiment of the invention is shown. An example scenario 50 is shown. The example scenario 50 may comprise a number of people 52a-52b, a number of people 54a-54b, a person 60 and/or an apparatus (or block, or circuit, or device). The apparatus 100 may be configured to implement an embodiment of the present invention. The apparatus 100 may implement a camera system featuring an intelligent personal audio assistant.

The camera system 100 may be configured to capture video and/or audio. The camera system 100 may be configured to interpret instructions from the received audio. In an example, a speaker may talk to the camera system 100 to provide audio instructions. The camera system 100 may interpret the instructions and/or perform commands (e.g., features, functions, responses, etc.). In some embodiments, the camera system 100 may be connected to other devices (not shown). For example, the camera system 100 may perform responses to the audio instructions by accessing other devices (e.g., provide a signal to an actuator to cause the actuator to perform the desired command). In some embodiments, the camera system 100 may be configured to perform the command using internal components of the camera system 100. The types of commands performed and/or how the apparatus 100 performs the commands may be varied according to the design criteria of a particular implementation.

Lines 102a-102b are shown. The lines 102a-102b may represent a field of view of the camera system 100. The camera system 100 may capture video frames of the area within the field of view 102a-102b. In the example scenario 50, the lines 102a-102b may provide an illustrative example of the field of view of the camera system 100. In some embodiments, the camera system 100 may comprise one single 360-degree camera (e.g., capturing a 360-degree field of view). In some embodiments, the camera system 100 may comprise two back-to-back 180-degree cameras for capturing two 180-degree fields of view (e.g., in front and behind the camera system 100). In some embodiments, the camera system 100 may implement a fisheye lens providing a wide-angle field of view. The types of lenses used and/or the field of view captured by the camera system 100 may be varied according to the design criteria of a particular implementation.

In the example scenario 50, the people 52a-52b may be outside of the field of view 102a-102b of the camera system 100. In the example shown, the people 52a-52b may not be visible in the video frames captured by the camera system 100. Sound from the people 52a-52b may be captured by the camera system 100. In the example shown, the people 52a-52b may not be providing speech commands to the camera system 100

In the example scenario 50, the people 54a-54g may be within the field of view 102a-102b of the camera system 100. In the example shown, the people 54a-54g may be visible in the video frames captured by the camera system 100. Sound from the people 52a-52b may be captured by the camera system 100. In the example shown, the people 54a-54g may not be providing speech commands to the camera system 100.

In the example scenario 50, the person 60 may be within the field of view 102a-102b of the camera system 100. Sound from the person 60 may be captured by the camera system 100. In the example shown, the person 60 may be providing a speech command (e.g., INSTR) to the camera system 100. The person 60 may be the speaker (e.g., an audio source).

The camera system 100 may be configured to locate the speaker 60. The camera system 100 may implement a directional microphone arrangement. The directional microphone arrangement may be configured to receive the audio commands (e.g., the signal INSTR). The directional microphone arrangement of the camera system 100 may be configured to identify (e.g., locate, triangulate, etc.) the direction of the user/speaker 60.

Lines 104a-104b are shown. The lines 104a-104b may represent the direction of the audio instructions INSTR determined by the camera system 100. After the camera system 100 determines the audio location 104a-104b, the camera system 100 may perform various video operations to identify the speaker 60. Based on the identity of the speaker 60, the camera system 100 may determine whether the speaker 60 has permission to access the functionality corresponding to the audio instruction INSTR.

The camera system 100 may be configured to distinguish between the audio command INSTR and other audio in the environment (e.g., other people talking, ambient noise, etc.). In one example, the audio command INSTR may start with a particular keyword. Once the keyword is detected, the camera system 100 may interpret the following audio as the audio command INSTR. In some embodiments, the apparatus 100 may implement speech detection to extract the audio command INSTR from audio in the environment. The method of detecting the audio command may be varied according to the design criteria of a particular implementation.

Figure 2:
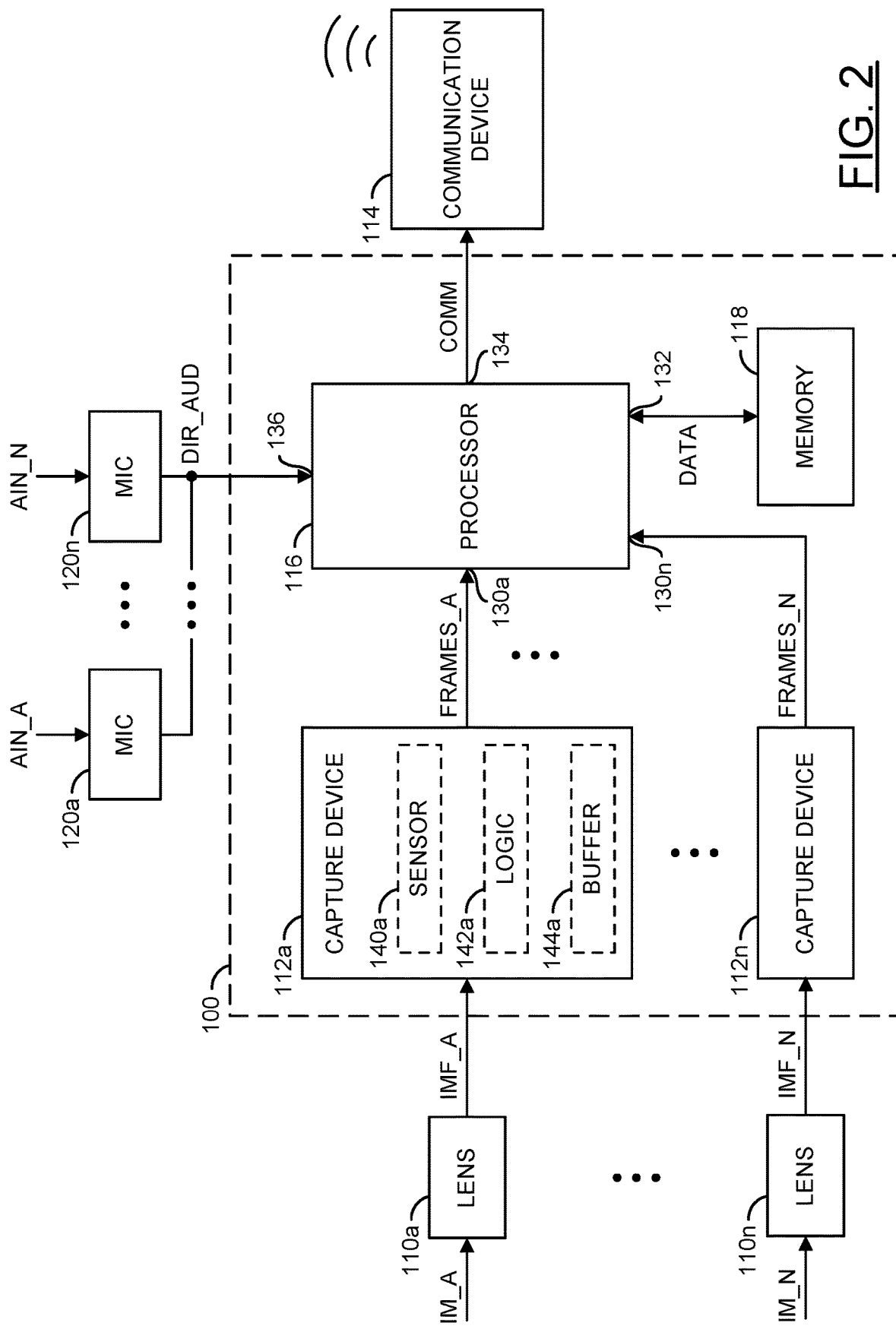
FIG. 2 is a block diagram illustrating an example embodiment of the invention.

Referring to FIG. 2 a block diagram illustrating an example embodiment of the invention is shown. The apparatus 100 generally comprises blocks (or circuits) 110a-110n, blocks (or circuits) 112a-112n, a block (or circuit) 114, a block (or circuit) 116, a block (or circuit) 118 and/or blocks (or circuits) 120a-120n. The blocks 110a-110n may implement lenses. The circuits 112a-112n may implement capture devices. The circuit 114 may implement a communication device. The circuit 116 may implement a processor. The circuit 118 may implement a memory. The circuits 120a-120n may implement microphones. The apparatus 100 may comprise other components (not shown). The number, type and/or arrangement of the components of the apparatus 100 may be varied according to the design criteria of a particular implementation.

In an example implementation, the circuit 116 may be implemented as a video processor. The processor 116 may comprise inputs 130a-130n and/or other inputs. The processor 116 may comprise an input/output 132. The processor 116 may comprise an output 134 and/or other outputs. The processor 116 may comprise an input 136. The number of inputs, outputs and/or bi-directional ports implemented by the processor 116 may be varied according to the design criteria of a particular implementation.

In the embodiment shown, the capture devices 112a-112n may be components of the apparatus 100. In some embodiments, the capture devices 112a-112n may be separate devices (e.g., remotely connected to the camera system 100, such as a drone and/or a system of security cameras configured to send captured video data to a central location) configured to send data to the apparatus 100. Similarly, in the example shown, the wireless communication device 114 and/or the microphones 120a-120n are shown external to the apparatus 100 but in some embodiments may be a component of the apparatus 100.

The apparatus 100 may receive one or more signals (e.g., IMF_A-IMF_N) and/or one or more signals (e.g., DIR_AUD). The apparatus 100 may present a signal (e.g., COMM). The capture devices 112a-112n may receive the signals IMF_A-IMF_N from the corresponding lenses 110a-110n. The processor 116 may receive the signal DIR_AUD from the microphones 120a-120n. The processor 116 may present the signal COMM to the communication device 114. For example, the wireless communication device 114 may be a radio-frequency (RF) transmitter. In another example, the communication device 114 may be a Wi-Fi module. In another example, the communication device 114 may be a device capable of implementing RF transmission, Wi-Fi, Bluetooth and/or other wireless communication protocols.

The lenses 110a-110n may capture signals (e.g., IM_A-IM_N). The signals IM_A-IM_N may be an image (e.g., an analog image) of the environment near the camera system 100 that are presented by the lenses 110a-110n to the capture devices 112a-112n as the signals IMF_A-IMF_N. The lenses 110a-110n may be implemented as an optical lens. The lenses 110a-110n may provide a zooming feature and/or a focusing feature. The capture devices 112a-112n and/or the lenses 110a-110n may be implemented, in one example, as a single lens assembly. In another example, the lenses 110a-110n may be a separate implementation from the capture devices 112a-112n. The capture devices 112a-112n are shown within the circuit 100. In an example implementation, the capture devices 112a-112n may be implemented outside of the circuit 100 (e.g., along with the lenses 110a-110n as part of a lens/capture device assembly).

The capture devices 112a-112n may be configured to capture image data for video (e.g., the signals IMF_A-IMF_N from the lenses 110a-110n). In some embodiments, the capture devices 112a-112n may be video capturing devices such as cameras. The capture devices 112a-112n may capture data received through the lenses 110a-110n to generate bitstreams (e.g., generate video frames). For example, the capture devices 112a-112n may receive focused light from the lenses 110a-110n. The lenses 110a-110n may be directed, tilted, panned, zoomed and/or rotated to provide a targeted view from the camera system 100 (e.g., to provide coverage for a panoramic field of view such as the field of view 102a-102b). The capture devices 112a-112n may generate signals (e.g., FRAMES_A-FRAMES_N). The signals FRAMES_A-FRAMES_N may be video data (e.g., a sequence of video frames). The signals FRAMES_A-FRAMES_N may be presented to the inputs 130a-130n of the processor 116.

The capture devices 112a-112n may transform the received focused light signals IMF_A-IMF_N into digital data (e.g., bitstreams). In some embodiments, the capture devices 112a-112n may perform an analog to digital conversion. For example, the capture devices 112a-112n may perform a photoelectric conversion of the focused light received by the lenses 110a-110n. The capture devices 112a-112n may transform the bitstreams into video data, video files and/or video frames. In some embodiments, the video data generated by the capture devices 112a-112n may be uncompressed and/or raw data generated in response to the focused light from the lenses 110a-110n. In some embodiments, the video data may be digital video signals. The video signals may comprise video frames.

In some embodiments, the video data may be encoded at a high bitrate. For example, the signal may be generated using a lossless compression and/or with a low amount of lossiness. The apparatus 100 may encode the video data captured by the capture devices 112a-112n to generate the signal COMM.

The communication device 114 may send and/or receive data to/from the apparatus 100. In some embodiments, the communication device 114 may be implemented as a wireless communications module. In some embodiments, the communication device 114 may be implemented as a satellite connection to a proprietary system. In one example, the communication device 114 may be a hard-wired data port (e.g., a USB port, a mini-USB port, a USB-C connector, HDMI port, an Ethernet port, a DisplayPort interface, a Lightning port, etc.). In another example, the communication device 114 may be a wireless data interface (e.g., Wi-Fi, Bluetooth, ZigBee, cellular, etc.).

The processor 116 may receive the signals FRAMES_A-FRAMES_N from the capture devices 112a-112n at the inputs 130a-130n. The processor 116 may send/receive a signal (e.g., DATA) to/from the memory 118 at the input/output 132. The processor 116 may send a signal (e.g., COMM) to the communication device 114. The processor 116 may receive the signal DIR_AUD from the microphones 120a-120n. In an example, the processor 116 may be connected through a bi-directional interface (or connection) to the capture devices 112a-112n, the communication device 114, the memory 118 and/or the microphones 120a-120n. The processor 116 may store and/or retrieve data from the memory 118. The memory 118 may be configured to store computer readable/executable instructions (or firmware). The instructions, when executed by the processor 116, may perform a number of steps.

The signal FRAMES_A-FRAMES_N may comprise video data (e.g., one or more video frames) providing a field of view captured by the lenses 110a-110n. The processor 116 may be configured to generate the signal COMM and/or other signals (not shown). The signal COMM may be generated based on one or more decisions made and/or functions performed by the processor 116. The decisions made and/or functions performed by the processor 116 may be determined based on data received by the processor 116 at the inputs 130a-130n (e.g., the signals FRAMES_A-FRAMES_N), the input 132, the input 136 and/or other inputs.

The inputs 130a-130n, the input/output 132, the output 134, the input 136 and/or other inputs/outputs may implement an interface. The interface may be implemented to transfer data to/from the processor 116, the communication device 114, the capture devices 112a-112n, the memory 118, the microphones 120a-120n and/or other components of the apparatus 100. In one example, the interface may be configured to receive (e.g., via the inputs 130a-130n) the video streams FRAMES_A-FRAMES_N each from a respective one of the capture devices 112a-112n. In another example, the interface may be configured to receive (e.g., via the input 136) the directional audio DIR_AUD. In yet another example, the interface may be configured to transmit communication data (e.g., the signal COMM) to the communication device 114. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal COMM may be presented to the communication device 114. In some embodiments, the signal COMM may be an encoded, cropped, stitched and/or enhanced version of one or more of the signals FRAMES_A-FRAMES_N. In an example, the signal COMM may be a high resolution, digital, encoded, de-warped, stabilized, cropped, blended, stitched and/or rolling shutter effect corrected version of the signals FRAMES_A-FRAMES_N.

In some embodiments, the signal COMM may be the audio command. For example, the processor 116 may forward the audio command to a cloud computing service via the communication device 114, the cloud computing service may determine the instruction provided by the speaker 60, the cloud computer service may communicate the instruction(s) to the processor 116 via the communication device 114 and the processor 116 may perform the instruction(s). In some embodiments, the signal COMM may be instructions determined by the processor 116 that are sent using the communication device 114 to an external component in order to be performed. In an example, if the audio command is to purchase a product, the processor 116 may determine the instructions from the audio command INSTR, generate the signal COMM in response to the product purchase instruction, and the signal COMM may comprise information about the product to be purchased. The communication device 114 may communicate the signal COMM to a shopping service (e.g., in a format compatible with an API for an online store) and the shopping service may be the external component that fulfills the purchase of the product.

In some embodiments, the signal COMM may be data generated by the processor 116 (e.g., video analysis results, speech analysis results, profile information of users, etc.) that may be communicated to a cloud computing service in order to aggregate information and/or provide training data for machine learning (e.g., to improve speech recognition, to improve facial recognition, to provide relevant ads to the users, etc.). The type of information communicated by the signal COMM may be varied according to the design criteria of a particular implementation. In an example, a cloud computing platform (e.g., distributed computing) may be implemented as a group of cloud-based, scalable server computers. By implementing a number of scalable servers, additional resources (e.g., power, processing capability, memory, etc.) may be available to process and/or store variable amounts of data. For example, the cloud computing service may be configured to scale (e.g., provision resources) based on demand. The scalable computing may be available as a service to allow access to processing and/or storage resources without having to build infrastructure (e.g., the provider of the apparatus 100 may not have to build the infrastructure of the cloud computing service).

The apparatus 100 may implement a camera system. In some embodiments, the camera system 100 may be implemented as a drop-in solution (e.g., installed as one component). In an example, the camera system 100 may be a device that may be installed as an after-market product (e.g., a retro-fit for a drone, a retro-fit for a security system, etc.). In some embodiments, the apparatus 100 may be a component of a security system. The number and/or types of signals and/or components implemented by the camera system 100 may be varied according to the design criteria of a particular implementation.

The video data of the targeted view captured in the field of view 102a-102b may be represented as the signals/bitstreams/data FRAMES_A-FRAMES_N (e.g., video signals). The capture devices 112a-112n may present the signals FRAMES_A-FRAMES_N to the inputs 130a-130n of the processor 116. The signals FRAMES_A-FRAMES_N may represent the video frames/video data. The signals FRAMES_A-FRAMES_N may be video streams captured by the capture devices 112a-112n. In some embodiments, the capture devices 112a-112n may be implemented in the camera system 100. In some embodiments, the capture devices 112a-112n may be configured to add to existing functionality to the camera system 100.

Each of the capture devices 112a-112n may comprise a block (or circuit) 140, a block (or circuit) 142, and/or a block (or circuit) 144. The circuit 140 may implement a camera sensor (e.g., a complementary metal-oxide-semiconductor (CMOS) sensor). The circuit 142 may implement a camera processor/logic. The circuit 144 may implement a memory buffer. As a representative example, the capture device 112a is shown comprising the sensor 140a, the logic block 142a and the buffer 144a. The camera sensors 140a-140n may receive light from the corresponding one of the lenses 110a-110n and transform the light into digital data (e.g., the bitstreams).

In one example, the sensor 140a of the capture device 112a may receive light from the lens 110a. The camera sensor 140a of the capture device 112a may perform a photoelectric conversion of the light from the lens 110a. In some embodiments, the sensor 140a may be an oversampled binary image sensor. The logic 142a may transform the bitstream into a human-legible content (e.g., video data). For example, the logic 142a may receive pure (e.g., raw) data from the camera sensor 140a and generate video data based on the raw data (e.g., the bitstream). The memory buffer 144a may store the raw data and/or the processed bitstream. For example, the frame memory and/or buffer 144a may store (e.g., provide temporary storage and/or cache) one or more of the video frames (e.g., the video signal).

The microphones 120a-120n may be configured to capture incoming audio and/or provide directional information about the incoming audio. Each of the microphones 120a-120n may receive a respective signal (e.g., AIN_A-AIN_N). The signals AIN_A-AIN_N may be audio signals from the environment near the apparatus 100. For example, the signals AIN_A-AIN_N may be ambient noise in the environment and/or the audio command signal INSTR from the speaker 60. The microphones 120a-120n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 120a-120n may provide the signal DIR_AUD to the interface 136. The apparatus 100 may comprise the interface 136 configured to receive data (e.g., the signal DIR_AUD) from one or more of the microphones 120a-120n. In one example, data from the signal DIR_AUD presented to the interface 136 may be used by the processor 116 to determine the location of the signal INSTR. In another example, the microphones 120a-120n may be configured to determine the location of the signal INSTR and present the location to the interface 136 as the signal DIR_AUD.

The number of microphones 120a-120n may be varied according to the design criteria of a particular implementation. The number of microphones 120a-120n may be selected to provide sufficient directional information about the incoming audio (e.g., the number of microphones 120a-120n implemented may be varied based on the accuracy and/or resolution of directional information acquired). In an example, 2 to 6 of the microphones 120a-120n may be implemented. In some embodiments, an audio processing component may be implemented with the microphones 120a-120n to process and/or encode the incoming audio signals AIN_A-AIN_N. In some embodiments, the processor 116 may be configured with on-chip audio processing. The microphones 120a-120n may capture audio of the environment. The apparatus 100 may be configured to synchronize the audio captured with the images captured by the capture devices 112a-112n.

The processor 116 may be configured to execute computer readable code and/or process information. The processor 116 may be configured to receive input and/or present output to the memory 118. The processor 116 may be configured to present and/or receive other signals (not shown). The number and/or types of inputs and/or outputs of the processor 116 may be varied according to the design criteria of a particular implementation.

The processor 116 may receive the signals FRAMES_A-FRAMES_N, the signal DIR_AUDIO and/or the signal DATA. The processor 116 may make a decision based on data received at the inputs 130a-130n, the input 132, the input 136 and/or other input. For example other inputs may comprise external signals generated in response to user input, external signals generated by the microphones 120a-120n and/or internally generated signals such as signals generated by the processor 116 in response to analysis of the signals FRAMES_A-FRAMES_N and/or objects detected in the signals FRAMES_A-FRAMES_N. The processor 116 may adjust the video data (e.g., crop, digitally move, physically move the camera sensor 140, etc.) of the signals FRAMES_A-FRAMES_N. The processor 116 may generate the signal COMM in response data received by the inputs 130a-130n, the input 132, the input 136 and/or the decisions made in response to the data received by the inputs 130a-130n, the input 132 and/or the input 136.

The signal COMM may be generated to provide an output for the communication device 114 in response to the captured video frames (e.g., the signal FRAMES_A-FRAMES_N) and the video analytics performed by the processor 116. For example, the video analytics may be performed by the processor 116 in real-time and/or near real-time (e.g., with minimal delay). In one example, the signal COMM may be a live (or nearly live) video stream.

Generally, the facial recognition video operations performed by the processor 116 may correspond to the data received at the inputs 130a-130n, the input 132, the input 136 and/or enhanced (e.g., stabilized, corrected, cropped, downscaled, packetized, compressed, etc.) by the processor 116. For example, the facial recognition video operations may be performed in response to a stitched, corrected, stabilized, cropped and/or encoded version of the signals FRAMES_A-FRAMES_N. The processor 116 may further encode and/or compress the signals FRAMES_A-FRAMES_N to generate the signal COMM.

The cropping, downscaling, blending, stabilization, packetization, encoding, compression and/or conversion performed by the processor 116 may be varied according to the design criteria of a particular implementation. For example, the signal COMM may be a processed version of the signals FRAMES_A-FRAMES_N configured to fit the target area to the shape and/or specifications of a playback device. For example, the playback device may be implemented for real-time video streaming of the signal COMM received from the apparatus 100.

In some embodiments, the signal COMM may be some view (or derivative of some view) captured by the capture devices 112a-112n. For example, the signal COMM may comprise a portion of the panoramic video captured by the capture devices 112a-112n. In another example, the signal COMM may be a video frame comprising the region of interest selected and/or cropped from the panoramic video frame by the processor 116. The signal COMM may comprise a video frame having a smaller size than the panoramic video frames FRAMES_A-FRAMES_N. In some embodiments, the signal COMM may provide a series of cropped and/or enhanced panoramic video frames that improve upon the view from the perspective of the camera system 100 (e.g., provides night vision, provides High Dynamic Range (HDR) imaging, provides more viewing area, highlights detected objects, provides additional data such as a numerical distance to detected objects, provides visual indicators for paths of a race course, etc.).

The memory 118 may store data. The memory 118 may be implemented as a cache, flash memory, DRAM memory, etc. The type and/or size of the memory 118 may be varied according to the design criteria of a particular implementation. The data stored in the memory 118 may correspond to a video file, a facial recognition database, user profiles, user permissions, etc.

The lenses 110a-110n (e.g., camera lenses) may be directed to provide a panoramic view from the camera system 100. The lenses 110a-110n may be aimed to capture environmental data (e.g., light). The lens 110a-110n may be configured to capture and/or focus the light for the capture devices 112a-112n. Generally, the camera sensor 140 is located behind each of the lenses 110a-110n. Based on the captured light from the lenses 110a-110n, the capture devices 112a-112n may generate a bitstream and/or video data.

Embodiments of the processor 116 may perform video stitching operations on the signals FRAMES_A-FRAMES_N. In one example, each of the video signals FRAMES_A-FRAMES_N may provide a portion of a panoramic view and the processor 116 may crop, blend, synchronize and/or align the signals FRAMES_A-FRAMES_N to generate the panoramic video frames. In some embodiments, the processor 116 may be configured to perform electronic image stabilization (EIS). The processor 116 may perform de-warping on the signals FRAMES_A-FRAMES_N. The processor 116 may perform intelligent video analytics on the de-warped video frames FRAMES_A-FRAMES_N. The processor 116 may encode the signals FRAMES_A-FRAMES_N to a particular format.

In some embodiments, the cropped and/or enhanced portion of the panoramic video generated by the processor 116 may be sent to the output 134 (e.g., the signal COMM). In one example, the signal COMM may be an HDMI output. In another example, the signal COMM may be a composite (e.g., NTSC) output (e.g., composite output may be a low-cost alternative to HDMI output). In yet another example, the signal COMM may be a S-Video output. In some embodiments, the signal COMM may be an output sent via interfaces such as USB, SDIO, Ethernet and/or PCIe. The portion of the panoramic video signal COMM may be output to the wireless communication device 114.

The video generated by the processor 116 may also be used to implement a panoramic video having high-quality video in the region of interest. The video generated by the processor 116 may be used to implement a panoramic video that reduces bandwidth needed for transmission by cropping out the portion of the panoramic that has not been selected by the intelligent video analytics and/or the directional audio signal DIR_AUD as the region of interest. To generate a high-quality, enhanced video using the region of interest, the processor 116 may be configured to perform encoding, blending, cropping, aligning and/or stitching.

The encoded video may be processed locally and discarded, stored locally and/or transmitted wirelessly to external storage and/or external processing (e.g., network attached storage, cloud storage, distributed processing, etc.). In one example, the encoded, panoramic video may be stored locally by the memory 118. In another example, the encoded, panoramic video may be stored to a hard-drive of a networked computing device. In yet another example, the encoded, panoramic video may be transmitted wirelessly without storage. The type of storage implemented may be varied according to the design criteria of a particular implementation.

In some embodiments, the processor 116 may be configured to send analog and/or digital video out (e.g., the signal COMM) to the video communication device 114. In some embodiments, the signal COMM generated by the apparatus 100 may be a composite and/or HDMI output. The processor 116 may receive an input for the video signal (e.g., the signals FRAMES_A-FRAMES_N) from the CMOS sensor(s) 140a-140n. The input video signals FRAMES_A-FRAMES_N may be enhanced by the processor 116 (e.g., color conversion, noise filtering, auto exposure, auto white balance, auto focus, etc.).

Generally, the panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view 102a-102b captured by the camera system 100 may be used to generate panoramic video such as a spherical video, a hemispherical video, a 360 degree video, a wide angle video, a video having less than a 360 field of view, etc.

Panoramic videos may comprise a view of the environment near the camera system 100. In one example, the entire field of view 102a-102b of the panoramic video may be captured at generally the same time (e.g., each portion of the panoramic video represents the view from the camera system 100 at one particular moment in time). In some embodiments (e.g., when the camera system 100 implements a rolling shutter sensor), a small amount of time difference may be present between some portions of the panoramic video. Generally, each video frame of the panoramic video comprises one exposure of the sensor (or the multiple sensors 140a-140n) capturing the environment near the camera system 100. In some embodiments, the field of view 102a-102b may provide coverage for a full 360 degree field of view. In some embodiments, less than a 360 degree view may be captured by the camera system 100 (e.g., a 270 degree field of view, a 180 degree field of view, etc.). In some embodiments, the panoramic video may comprise a spherical field of view (e.g., capture video above and below the camera system 100). For example, the camera system 100 may be mounted on a ceiling and capture a spherical field of view of the area below the camera system 100. In some embodiments, the panoramic video may comprise a field of view that is less than a spherical field of view (e.g., the camera system 100 may be configured to capture the ground below and the areas to the sides of the camera system 100 but nothing directly above). The implementation of the camera system 100 and/or the captured field of view 102a-102b may be varied according to the design criteria of a particular implementation.

In embodiments implementing multiple lenses, each of the lenses 110a-110n may be directed towards one particular direction to provide coverage for a full 360 degree field of view. In embodiments implementing a single wide angle lens (e.g., the lens 110a), the lens 110a may be located to provide coverage for the full 360 degree field of view (e.g., on the bottom of the camera system 100 in a ceiling mounted embodiment, on the bottom of a drone camera, etc.). In some embodiments, less than a 360 degree view may be captured by the lenses 110a-110n (e.g., a 270 degree field of view, a 180 degree field of view, etc.). In some embodiments, the lenses 110a-110n may move (e.g., the direction of the capture devices may be controllable). In some embodiments, one or more of the lenses 110a-110n may be configured to implement an optical zoom (e.g., the lenses 110a-110n may zoom in/out independent of each other).

In some embodiments, the apparatus 100 may be implemented as a system on chip (SoC). For example, the apparatus 100 may be implemented as a printed circuit board comprising one or more components (e.g., the capture devices 112a-112n, the processor 116, the communication device 114, the memory 118, etc.). The apparatus 100 may be configured to perform intelligent video analysis on the video frames of the de-warped, panoramic video. The apparatus 100 may be configured to crop and/or enhance the panoramic video.

In some embodiments, the processor 116 may be configured to perform sensor fusion operations. The sensor fusion operations performed by the processor 116 may be configured to analyze information from multiple sources (e.g., the capture devices 112a-112n and the microphones 120a-120n). By analyzing various data from disparate sources, the sensor fusion operations may be capable of making inferences about the data that may not be possible from one of the data sources alone. For example, the sensor fusion operations implemented by the processor 116 may analyze video data (e.g., mouth movements of the audio source 60) as well as the speech patterns from the directional audio DIR_AUD. The disparate sources may be used to develop a model of a scenario to support decision making. For example, the processor 116 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 116 may implement convolutional neural network capabilities. The convolutional neural network capabilities may implement computer vision using deep learning techniques. The convolutional neural network capabilities may be configured to implement pattern and/or image recognition using a training process through multiple layers of feature-detection.

Figure 3:
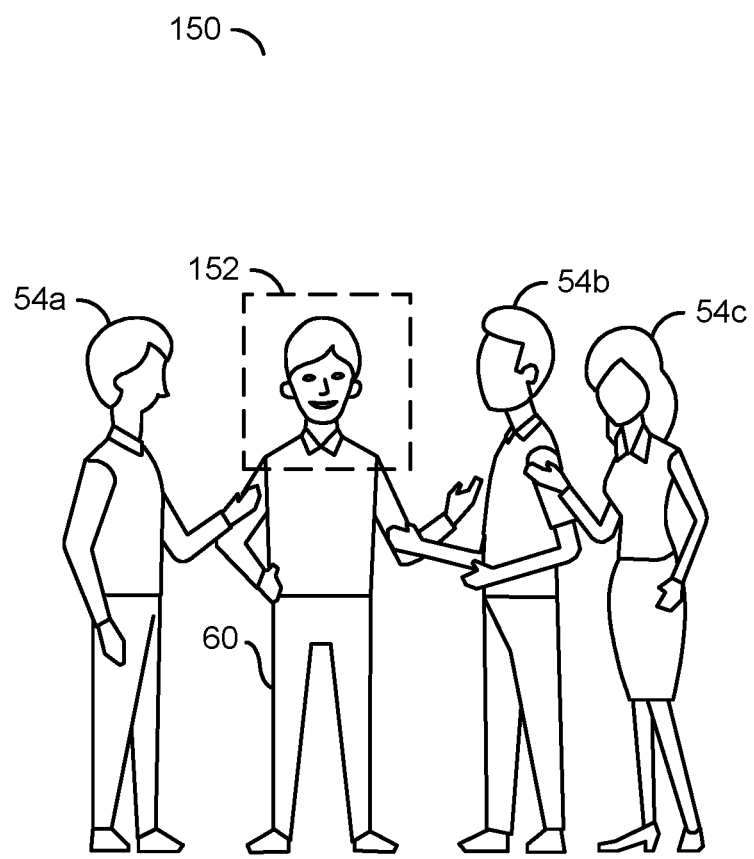
FIG. 3 is a diagram illustrating detecting a speaker in an example video frame.

Referring to FIG. 3, a diagram illustrating detecting the speaker 60 in an example video frame is shown. An example video frame 150 is shown. For example, the example video frame 150 may be a representative example of one of the video frames FRAMES_A-FRAMES_N captured by one of the capture devices 112a-112n. The example video frame 150 may capture the area within the field of view 102a-102n shown in association with FIG. 1. For clarity, the example video frame 150 may show a portion of the area within the field of view 102a-102n.

The example video frame 150 may comprise the people 54a-54c. The example video frame 150 may comprise the speaker 60. An area of interest (e.g., region of interest (ROI)) 152 is shown. The area of interest 152 may be located around a face of the speaker 60.

Using the information from the directional microphones 120a-120n (e.g., the signal DIR_AUD), the processor 116 may determine the direction of the speaker 60. The processor 116 may translate the directional information from the directional microphones 120a-120n to a corresponding location in the video frames FRAMES_A-FRAMES_N. The area of interest 152 may be the Location of the audio source translated to the video frame 150. Once the direction of the speaker 60 has been identified, the processor 116 may perform the video operations on the area of interest 152. In one example, the processor 116 may be configured to crop out the area 152 of the video image capturing the face of the speaker 60. The processor 116 may then perform video operations to increase resolution and zoom in on the area of interest 152. The video operations may improve the results of facial recognition.

In some embodiments, the video frame 150 may be a 360-degree video frame (e.g., the camera system 100 may capture a 360-degree field of view). In a 360-degree field of view video frame, all the people 54a-54n would be in the captured video frame 150. Similarly, the directional audio DIR_AUD may be analyzed by the processor 116 to determine the corresponding location of the audio source 60 in the video frame 150.

In the example video frame 150, multiple faces may be captured. In the example shown, the faces of the people 54a-54c may be captured along with the face of the speaker

60. In the case where multiple faces are captured, the face recognition implemented by the processor 116 may be further extended to identify which person is speaking. The processor 116 may determine that the speaker 60 is speaking and the people 54*a*-54*c* are not speaking. In one example, the processor 116 may be configured to monitor mouth movements in the captured video frames. The mouth movements may be determined using the computer vision. The mouth movements may be combined (e.g., compared) with the voice data being received (e.g., the signal INSTR). The processor 116 may decide which of the people 54*a*–54*c* and the speaker 60 is speaking. For example, the processor 116 may determine which mouth movements align to the detected speech in the audio signal INSTR.

The processor 116 may be configured to analyze the directional audio signal DIR_AUD to determine the location of the audio source 60. In some embodiments, the location determined from the directional audio signal DIR_AUD may comprise a direction (e.g., a measurement in degrees from a center of the lens 112, a coordinate in a horizontal direction, etc.). In some embodiments, the location determined from the directional audio signal DIR_AUD may comprise multiple coordinates. For example, the location determined by the processor 116 may comprise a horizontal coordinate and a vertical coordinate from a center of the lens 112. In another example, the location determined by the processor 116 may comprise a measurement of degrees (or radians) of a polar angle and an azimuth angle. In yet another example, the location determined from the directional audio signal DIR_AUD may further comprise a depth coordinate. In the example shown, the location of the area of interest 152 may comprise at least a horizontal and vertical coordinate (e.g., the area of interest 152 is shown at face-level).

Figure 4:
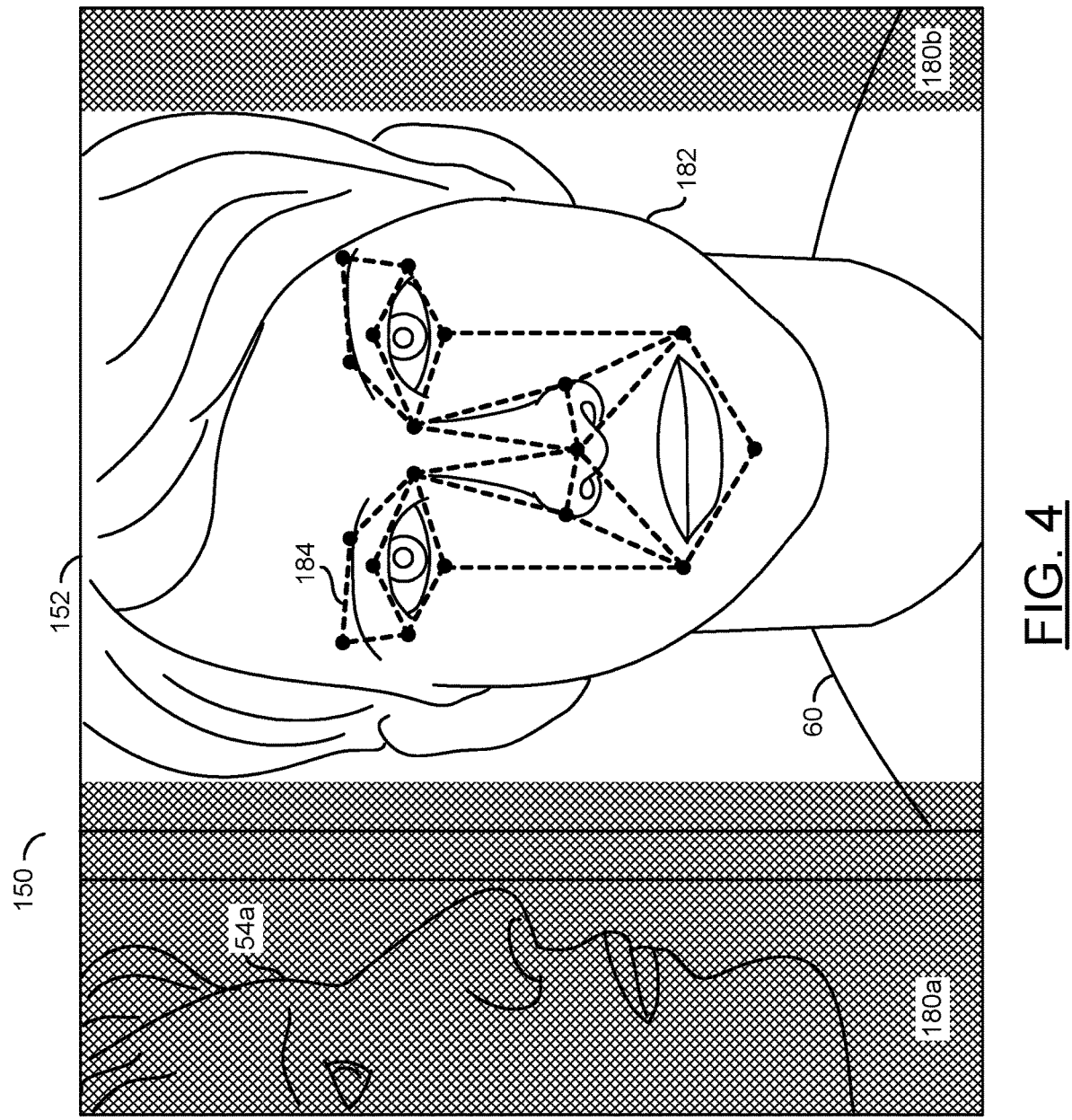
FIG. 4 is a diagram illustrating performing video operations on an example video frame.

Referring to FIG. 4, a diagram illustrating performing video operations on the example video frame 150 is shown. The processor 116 may be configured to perform video operations on the video frame 150 and/or the area of interest 152. In the example shown, the example video frame 150 may comprise the area of interest 152 and two areas 180*a*-180*b* adjacent to the area of interest 152. Similarly, there may be areas above and below the area of interest 152.

One of the video operations performed by the processor 116 may be a cropping operation. The cropping operation 116 may remove (e.g., delete, trim, etc.) one or more portions of the video frame 150. For example, the cropping operation may remove all portions of the video frame 150 except for the area of interest 152. In the example shown, the areas 180*a*-180*b* may be the cropped portions of the video frame 150 (e.g., shown for illustrative purposes). In the example shown, the person 54*a* may be in the cropped area 180*a*. The cropping operation may remove the person 54*a*.

The face 182 of the speaker 60 is shown within the area of interest 152. The sensors 140*a*-140*n* may implement a high-resolution sensor. Using the high resolution sensors 140*a*-140*n*, the processor 116 may combine over-sampling of the image sensors 140*a*-140*n* with digital zooming within the cropped area 152. The over-sampling and digital zooming may each be one of the video operations performed by the processor 116. The over-sampling and digital zooming may be implemented to deliver higher resolution images within the total size constraints of the cropped area 152.

In some embodiments, one or more of the lenses 110*a*-110*n* may implement a fisheye lens. One of the video operations implemented by the processor 112 may be a de-warping operation. The processor 116 may be configured to de-warp the window of interest 152. The de-warping may be configured to reduce and/or remove acute distortion caused by the fisheye lens and/or other lens characteristics. For example, the de-warping may reduce and/or eliminate a bulging effect to provide a rectilinear image.

A higher resolution image of the window of interest 152 may be generated in response to the video operations performed by the processor 116. The higher resolution image may enable the facial recognition computer vision to work with greater precision. The processor 116 may be configured to implement the facial recognition computer vision. The facial recognition computer vision may be one of the video operations performed by the processor 116.

Facial recognition operations 184 are shown on the face 182 of the speaker 60 in the area of interest 152. The facial recognition operations 184 may be an illustrative example of various measurements and/or relationships between portions of the face 182 calculated by the processor 116. The facial recognition operations 184 may be used to identify the speaker 60 as a specific (e.g., unique) individual. The facial recognition operations 184 may provide an output of the various measurements and/or relationships between the portions of the face 182. The output of the facial recognition operations 184 may be used to compare against a database of known faces. The known faces may comprise various measurements and/or relationships between the portions of faces in a format compatible with the output of the facial recognition operations 184.

Figure 5:
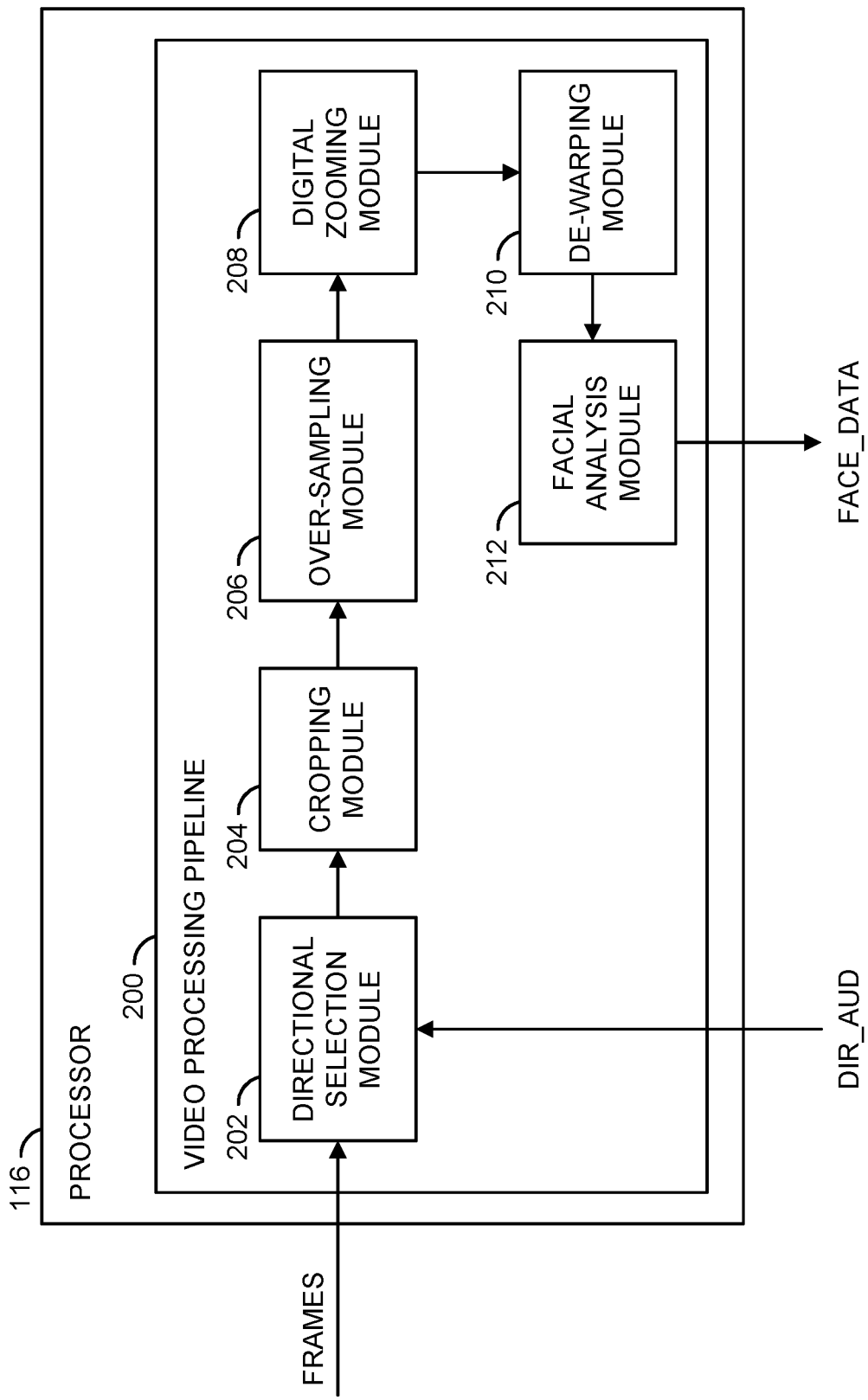
FIG. 5 is a block diagram illustrating an example video pipeline configured to perform video operations.

Referring to FIG. 5, a block diagram illustrating an example video pipeline configured to perform video operations is shown. The processor 116 may comprise a block (or circuit) 200. The circuit 200 may implement a video processing pipeline. The video processing pipeline may be configured to perform the various video operations implemented by the processor 116. The processor 116 may comprise other components (not shown). The number, type and/or arrangement of the components of the processor 116 may be varied according to the design criteria of a particular implementation.

The video processing pipeline 200 may be configured to receive an input signal (e.g., FRAMES) and/or an input signal (e.g., the signal DIR_AUD). The video processing pipeline may be configured to present an output signal (e.g., FACE_DATA). The video processing pipeline 200 may be configured to receive and/or generate other additional signals (not shown). The number, type and/or function of the signals received and/or generated by the video processing pipeline may be varied according to the design criteria of a particular implementation.

The video processing pipeline 200 may comprise a block (or circuit) 202, a block (or circuit) 204, a block (or circuit) 206, a block (or circuit) 208, a block (or circuit) 210 and/or a block (or circuit) 212. The circuit 202 may implement a directional selection module. The circuit 204 may implement a cropping module. The circuit 206 may implement an over-sampling module. The circuit 208 may implement a digital zooming module. The circuit 210 may implement a de-warping module. The circuit 212 may implement a facial analysis module. The video processing pipeline 200 may comprise other components (not shown). The number, type, function and/or arrangement of the components of the video processing pipeline 200 may be varied according to the design criteria of a particular implementation.

The circuits 202-212 may be conceptual blocks representing the video operations performed by the processor 116. In an example, the circuits 202-212 may share various resources and/or components. The order of the circuits 202-212 may be varied and/or may be changed in real-time (e.g., video data being processed through the video processing pipeline may not necessarily move from the circuit 202, to the circuit 204, then to the circuit 206, etc.). In some embodiments, one or more of the circuits 202-212 may operate in parallel.

The directional selection module 202 may be configured to receive the signal FRAMES (e.g., one or more of the signals FRAMES_A-FRAMES_N) from one or more of the capture devices 112a-112n. The directional selection module 202 may be configured to receive signal DIR_AUD from the directional microphones 120a-120n. The directional selection module 202 may be configured to extract the location of the audio source 60 based on the directional audio signal DIR_AUD. The directional selection module 202 may be configured to translate the information in the directional audio signal DIR_AUD to a location (e.g., coordinates) of the input video frames (e.g., the signal FRAMES). Based on the location, the directional selection module 202 may select the area of interest 152. In one example, the area of interest 152 may comprise Cartesian coordinates (e.g., an X, Y, and Z coordinate) and/or spherical polar coordinates (e.g., a radial distance, a polar angle and an azimuth angle). The format of the selected area of interest 152 generated by the direction selection module 202 may be varied according to the design criteria of a particular implementation.

The cropping module 204 may be configured to crop (e.g., trim to) the region of interest 152 from the full video frame 152 (e.g., generate the region of interest video frame). The cropping module 204 may receive the signal FRAMES and the selected area of interest information from the directional selection module 204. The cropping module 204 may use the coordinates of the area of interest to determine the portion of the video frame to crop. The cropped region may be the area of interest 152.

In an example, cropping the region of interest 152 selected may generate a second image. The cropped image (e.g., the region of interest video frame 152) may be smaller than the original video frame 150 (e.g., the cropped image may be a portion of the captured video). The area of interest 152 may be dynamically adjusted based on the location of the audio source 60 determined by the directional selection module 202. For example, the detected audio source 60 may be moving, and the location of the detected audio source 60 may move as the video frames are captured. The directional selection module 202 may update the selected region of interest coordinates and the cropping module 204 may dynamically update the cropped section 152 (e.g., the directional microphones 120a-120n may dynamically update the location based on the directional audio captured). The cropped section may correspond to the area of interest selected. As the area of interest changes, the cropped portion 152 may change. For example, the selected coordinates for the area of interest 152 may change from frame to frame, and the cropping module 204 may be configured to crop the selected region 152 in each frame. For each frame captured by the capture devices 112a-112n, the cropping module 204 may be configured to crop different coordinates, based on the location information determined from the signal DIR_AUD.

The over-sampling module 206 may be configured to over-sample the image sensors 140a-140n. The over-sampling of the image sensors 140a-140n may result in a higher resolution image. The higher resolution images generated by the over-sampling module 206 may be within total size constraints of the cropped region.

The digital zooming module 208 may be configured to digitally zoom into an area of a video frame. The digital zooming module 208 may digitally zoom into the cropped area of interest 152. For example, the directional selection module 202 may establish the area of interest 152 based on the directional audio, the cropping module 204 may crop the area of interest 152, and then the digital zooming module 208 may digitally zoom into the cropped region of interest video frame. In some embodiments, the amount of zooming performed by the digital zooming module 208 may be a user selected option.

The de-warping operations performed by the hardware de-warping module 210 may adjust the visual content of the video data. The adjustments performed by the de-warping module 210 may cause the visual content to appear natural (e.g., appear as seen by a person). In an example, the de-warping module 210 may alter the video data to generate a rectilinear video frame (e.g., correct artifacts caused by the lens characteristics of the lenses 110a-110n). The de-warping operations performed by the hardware de-warping module 210 may be implemented to correct the distortion caused by the lenses 110a-110n. The adjusted visual content may be presented by the de-warping module 210 to enable more accurate and/or reliable facial detection.

Implementing the de-warping module 210 as a hardware module may increase the video processing speed of the processor 116. The hardware implementation of the de-warping module 210 may de-warp the area of interest 152 faster than a software implementation. The hardware implementation of the de-warping module 210 may enable the video to be processed while reducing an amount of delay. For example, with the hardware implementation, the audio commands INSTR may be associated with the location of the audio source 60 in near real-time (e.g., low lag). The hardware implementation of the de-warping module 210 may implement the various calculations used to de-warp the area of interest 152 using hardware components. The hardware components used may be varied according to the design criteria of a particular implementation.

The facial analysis module 212 may be configured to perform the facial analysis operations 184. For example, the facial analysis module 202 may be configured to perform the measurements and/or comparisons of the facial features of the face 182 of the speaker 60 in the selected window of interest 152. Generally, the video operations performed by the circuits 202-210 may be implemented to facilitate an accurate and/or reliable detection of the facial features 184. For example, a high-resolution and de-warped area of interest 152 may reduce potential errors compared to a video frame that has warping present and/or a low resolution video frame. Cropping the input video frames to the area of interest 152 may reduce an amount of time and/or processing to perform the facial detection compared to performing the facial detection operations on a full video frame.

The facial analysis module 212 may be configured to generate the signal FACE_DATA. The signal FACE_DATA may comprise the facial information extracted from the area of interest 152 using the facial analysis operations 184. The data in the extracted information FACE_DATA may be compared against a database of facial information to find a match for the identity of the speaker 60. In some embodiments, the facial analysis module 212 may be configured to perform the comparisons of the detected facial information with the stored facial information in the database.

In some embodiments, the components 202-212 of the video processing pipeline 200 may be implemented as discrete hardware modules. In some embodiments, the components 202-212 of the video processing pipeline 200 may be implemented as one or more shared hardware modules. In some embodiments, the components 202-212 of the video processing pipeline 200 may be implemented as software functions performed by the processor 116.

Figure 6:
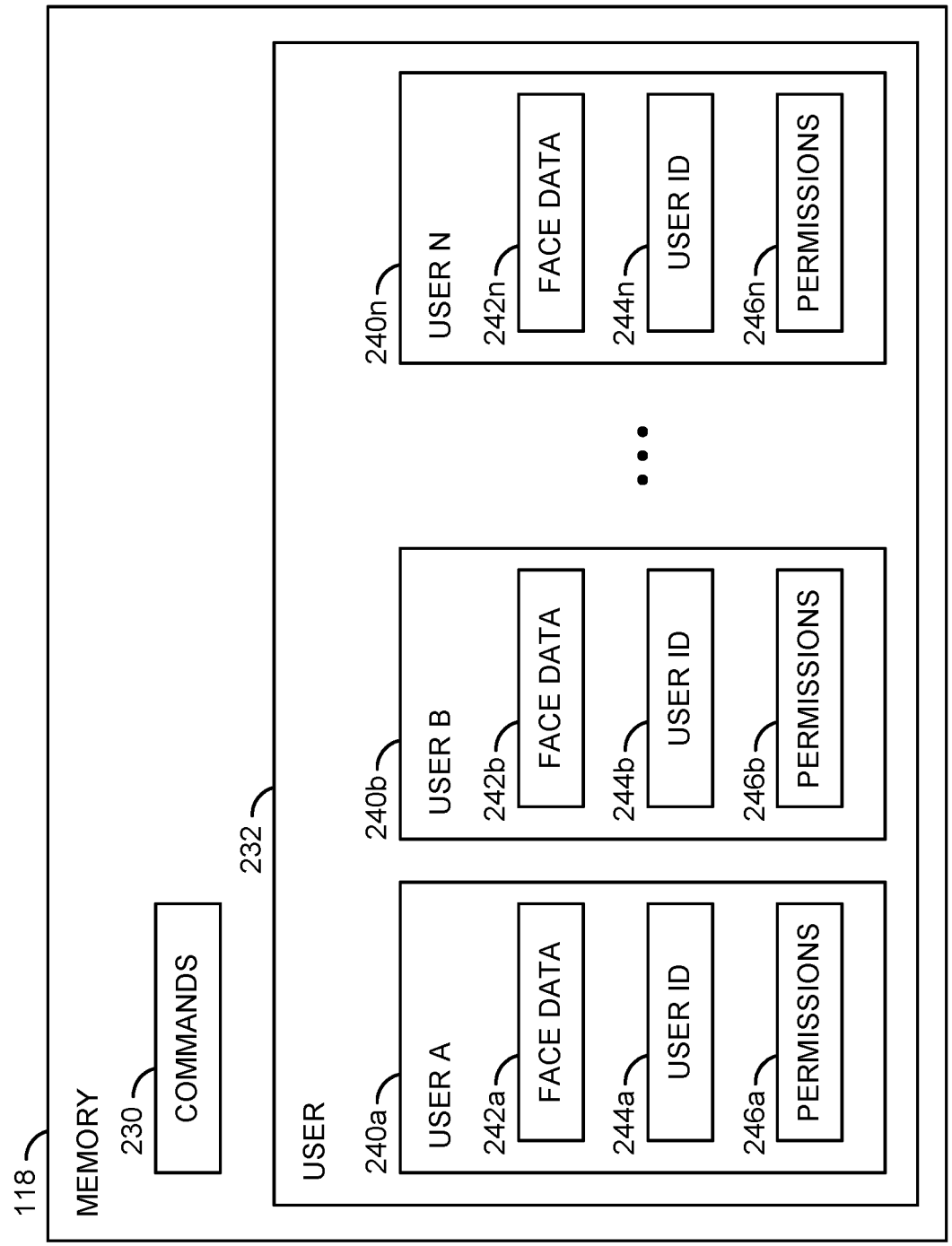
FIG. 6 is a diagram illustrating user profiles stored in a memory.

Referring to FIG. 6, a diagram illustrating user profiles stored in a memory is shown. The memory 118 is shown. In some embodiments, the database of facial information and/or the permissions may be stored locally on the apparatus 100 (e.g., by the memory 118). In some embodiments, the facial information and/or the permissions may be stored remotely (e.g., in a remote storage such as a cloud database) and the apparatus 100 may access the information using the communication device 114. The method of accessing the facial information and/or permissions may be varied according to the design criteria of a particular implementation.

The memory 118 may comprise a block (or circuit) 230 and/or a block (or circuit) 232. The circuit 230 may implement a commands storage. The circuit 232 may implement a user storage. The user storage 232 may comprise a block (or circuit) 240a-240n. The circuits 240a-240n may each implement a user profile. The user profiles 240a-240n may each comprise respective blocks (or circuits) 242a-242n, respective blocks (or circuits) 244a-244n and/or respective blocks (or circuits) 246a-246n. Each of the circuits 242a-242n may implement facial data storage for a respective one of the user profiles 240a-240n. Each of the circuits 244a-244n may implement user ID storage for a respective one of the user profiles 240a-240n. Each of the circuits 246a-246n may implement permissions storage for a respective one of the user profiles 240a-240n. The memory 118, the user storage 232 and/or the user profiles 240a-240n may each comprise other components (not shown). The number, type and/or arrangement of the components of the memory 118, the user storage 232 and/or the user profiles 240a 240n may be varied according to the design criteria of a particular implementation.

The commands 230 may store the various features that may be performed by the apparatus 100. The commands 230 may store an association between audio (e.g., speech) data and the various features. For example, the processor 116 may receive the audio command INSTR, extract the command from the voice data (e.g., by matching the speech patterns received with the stored speech patterns for the commands), determine the features and/or functions associated with the command received and, if the speaker 60 has permissions, perform the features and/or functions. In some embodiments, the matching of speech patterns may be performed using cloud processing (e.g., the audio command INSTR may be uploaded to a cloud processing service using the communication device 114, the cloud processing service may determine the command and provide the instructions to the processor 116).

The user storage 232 may store the user profiles 240a-240n for each user that has permission to use the apparatus 100. In one example, each user may register an account to use the apparatus 100 (e.g., the apparatus 100 may provide an API to enable users to create accounts, for example, using a web browser to access the apparatus 100). The method of creating a new user account may be varied according to the design criteria of a particular implementation.

Each of the user profiles 240a-240n may comprise a respective one of the face data storage 242a-242n. The face data storage 242a-242n may comprise a database of stored facial information about each of the users. The facial information stored in the face data 242a-242n may be accessed by the processor 116 to perform comparisons against the detected facial information FACE_DATA. The face data 242a-242n may enable the processor 116 to match the audio source 60 with one of the user profiles 240a-240n. In an example, if no match is found (e.g., the detected facial data FACE_DATA does not match any of the stored face data 242a-242n) then the command may be ignored. In another example, if a match is found (e.g., the detected facial data FACE_DATA does match one of the stored face data 242a-242n) then the processor 116 may check whether the user has permission to access the features and/or functions of the command provided.

Each of the user profiles 240a-240n may comprise a respective one of the user ID storage 244a-244n. The user ID storage 244a-244n may comprise general account information for the user profiles 240a-240n. In an example, the user ID storage 244a-244n may store login and/or authentication information (e.g., name, username, password, etc.). In another example, the user ID storage 244a-244n may comprise a history of commands provided. In still another example, the user ID storage 244a-244n may comprise preferences of the user that may be associated with relevant advertisements for the user. The type of information stored by the user ID storage 244a-244n may be varied according to the design criteria of a particular implementation.

Each of the user profiles 240a-240n may comprise a respective one of the permissions storage 246a-246n. The permissions 246a-246n may comprise data indicating which features and/or functions of the apparatus 100 each user is allowed to access. In some embodiments, the permissions 246a-246n may be associated with the commands 230. In one example, the permissions 246a-246n may comprise a string of binary bits formatted to correspond to the commands 230 (e.g., to provide an 'on' or 'off' for each command). In another example, the permissions 246a-246n may comprise a read, write or execute indicator associated with the commands 230. If the user profile 240a-240n associated with the speaker 60 does not have permission for the command INSTR provided, then the apparatus 100 may deny access to the feature and/or function. If the user profile 240a-240n associated with the speaker 60 does have permission for the command INSTR provided, then the apparatus 100 may initiate the feature and/or function.

Once the face 182 of the speaker has been captured the apparatus 100 may then check the captured face data (e.g., the signal FACE_DATA) against the existing database of faces 242a-242n to determine the identity of the speaker 60. The permissions 246a-246n associated with the matching one of the faces 242a-242n may define the rights and privileges that the speaker 60 has access to. In one example, the rights and privileges defined by the permissions 246a-246n may cover being able to enable or disable certain camera features. In another example, the rights and privileges defined by the permissions 246a-246n may cover whether the speaker 60 is allowed to make on-line transactions and/or purchases. The number, type and/or format of the permissions 246a-246n may be varied according to the design criteria of a particular implementation.

Figure 7:
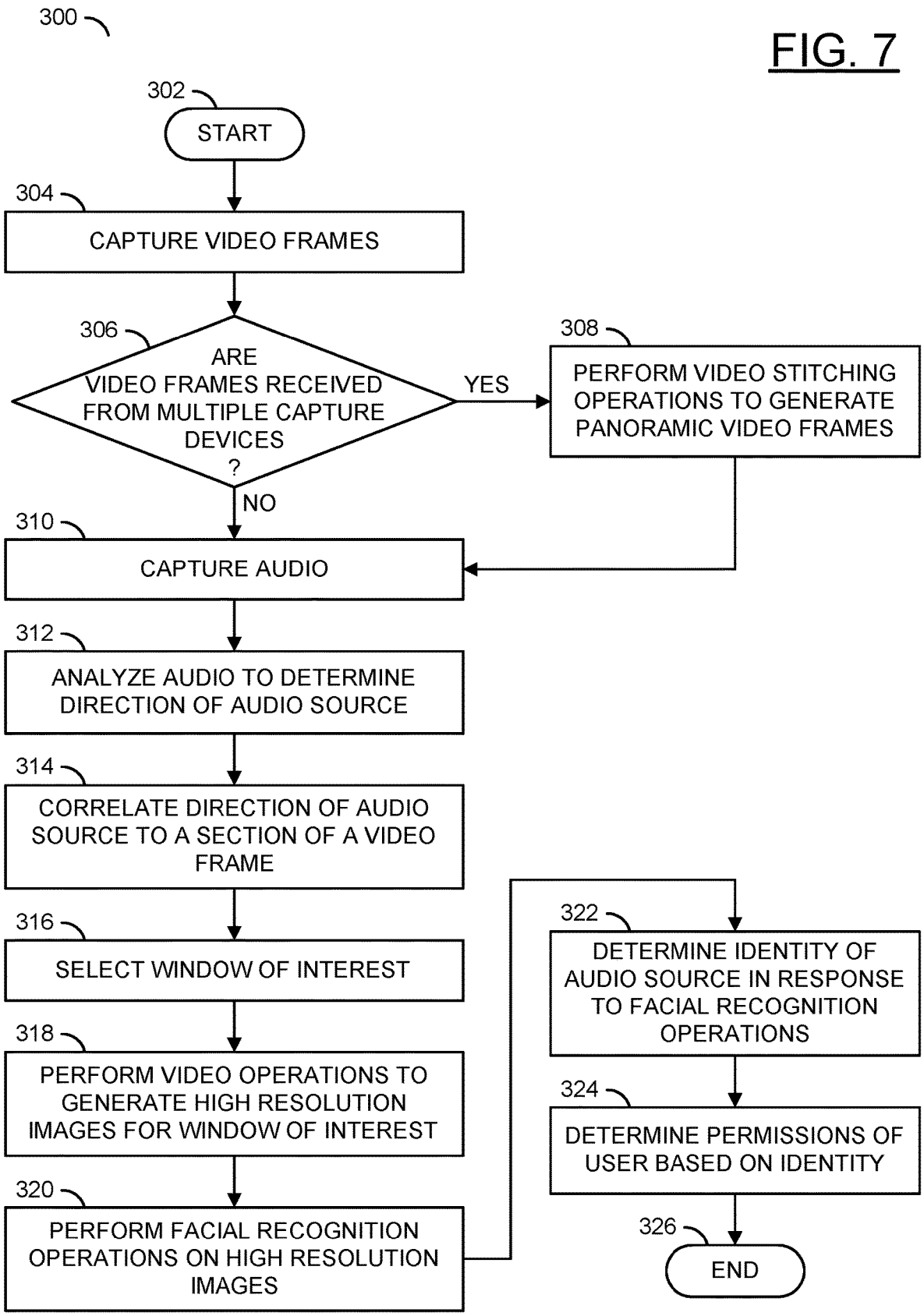
FIG. 7 is a flow diagram illustrating a method for performing video operations on captured video frames to determine permissions of a speaker.

Referring to FIG. 7, a method (or process) 300 is shown. The method 300 may perform video operations on captured video frames to determine permissions of a speaker. The method 300 generally comprises a step (or state) 302, a step (or state) 304, a decision step (or state) 306, a step (or state) 308, a step (or state) 310, a step (or state) 312, a step (or state) 314, a step (or state) 316, a step (or state) 318, a step (or state) 320, a step (or state) 322, a step (or state) 324, and a step (or state) 326.

The step 302 may start the method 300. In the step 304, one or more of the capture devices 112a-112n may capture the video frames FRAMES_A-FRAMES_N. Next, the method 300 may move to the decision step 306.

In the decision step 306, the processor 116 may determine whether the video frames FRAMES_A-FRAMES_N are received from multiple capture devices 112a-112n. If the video frames FRAMES_A-FRAMES_N are not received from multiple capture devices, the method 300 may move to the step 310. If the video frames FRAMES_A-FRAMES_N are received from multiple capture devices, the method 300 may move to the step 308. In the step 308, the processor 116 may perform video stitching operations to generate the panoramic video frames (e.g., the video frame 150). Next, the method 300 may move to the step 310.

In the step 310, the microphones 120a-120n may capture the audio AIN_A-AIN_N (e.g., comprising the signal INSTR). Next, in the step 312, the interface 136 may receive the signal DIR_AUD from the microphones 120a-120n and the processor 116 may analyze the audio signal DIR_AUD to determine a direction of the audio source 60. In the step 314, the processor 116 may correlate the direction 104a-104b of the audio source 60 to a section of the video frame 150. Next, in the step 316, the processor 116 may select the window of interest 152 for the video frame 150 based on the direction 104a-104b of the audio source 60. Next, the method 300 may move to the step 318.

Figure 8:
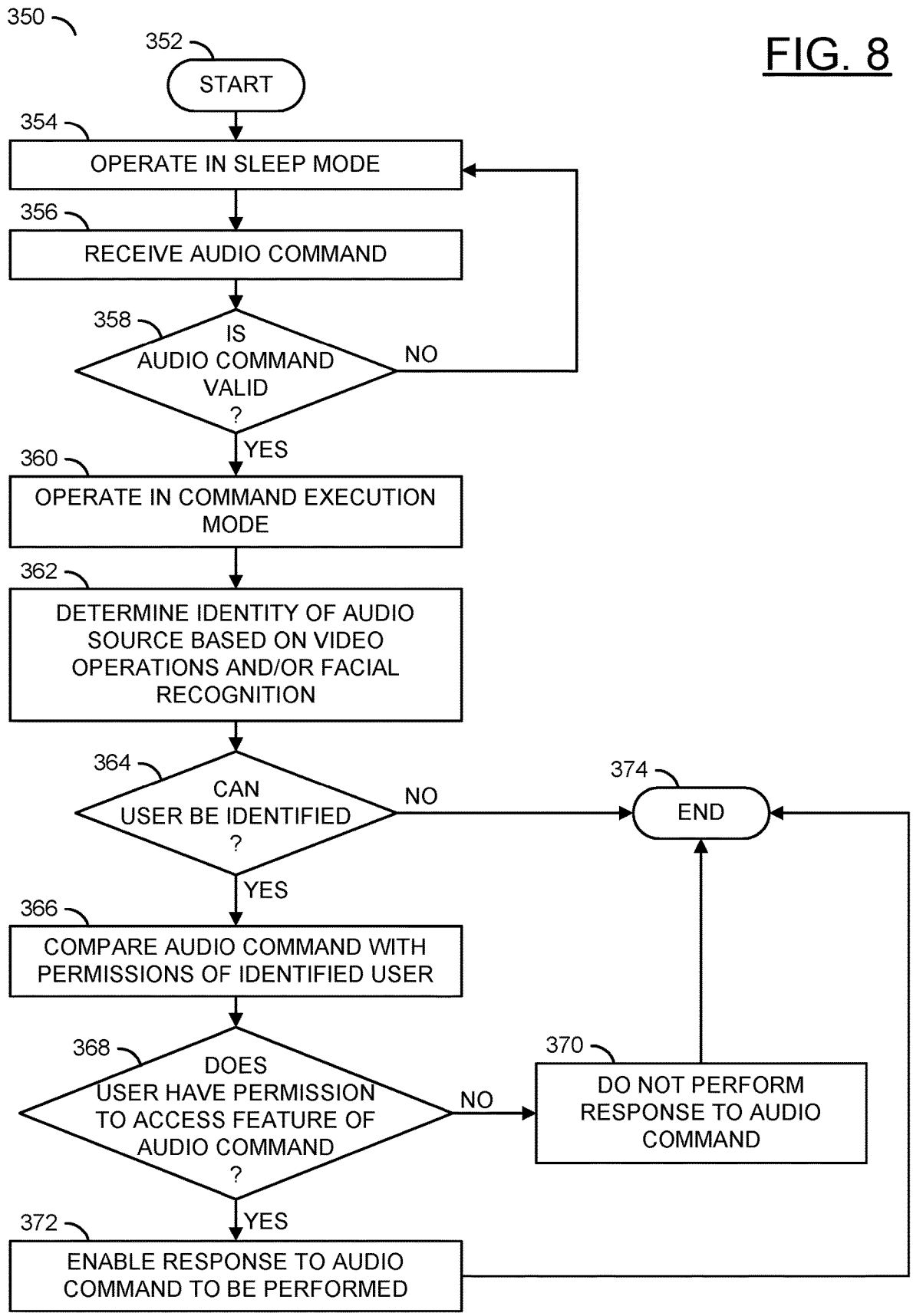
FIG. 8 is a flow diagram illustrating a method for determining whether a speaker has permission to access a feature.

In the step 318, the processor 116 may perform the video operations to generate high resolution images for the window of interest 152. Next, in the step 320, the processor 116 may perform the facial recognition operations 184 on the high resolution images of the window of interest 152 comprising the face 182 of the audio source 60. In the step 322, the processor 116 may determine the identity (e.g., one of the user IDs 244a-244n) of the audio source 60 in response to the facial recognition operations 184. Next, in the step 324, the processor 116 may determine the permissions 246a-246n of the user 60 based on the corresponding identity 244a-244n (e.g., part of the same user profile 240a-240n). Next, the method 300 may move to the step 326. The step 326 may end the method 300. Referring to FIG. 8, a method (or process) 350 is shown.

The method 350 may determine whether a speaker has permission to access a feature. The method 350 generally comprises a step (or state) 352, a step (or state) 354, a step (or state) 356, a decision step (or state) 358, a step (or state) 360, a step (or state) 362, a decision step (or state) 364, a step (or state) 366, a decision step (or state) 368, a step (or state) 370, a step (or state) 372, and a step (or state) 374.

The state 352 may start the method 350. Next, in the step 354, the apparatus 100 may operate in a sleep mode of operation. In the step 356, the microphones 120a-120n may receive the audio command INSTR from the audio source 60. Next, the method 350 may move to the decision step 358.

In the decision step 358, the processor 116 may determine whether the audio command is valid. In one example, an audio command may be valid if the signal INSTR corresponds with one of the commands 230. In another example, the audio command may be valid if the signal INSTR comprises a keyword (e.g., speaking the product name of the apparatus 100 first, a specific word or words that pre-empt a command). If the audio command is not valid, the method 350 may return to the step 354. If the audio command is valid, the method 350 may move to the step 360. In the step 360, the apparatus 100 may operate in a command execution mode. Next, in the step 362, the processor 116 may determine the identity of the audio source 60 based on the video operations and/or the facial recognition operations 184. Next, the method 350 may move to the decision step 364.

In the decision step 364, the processor 116 may determine whether the user (e.g., the audio source 60) can be identified.

For example, if the signal FACE_DATA generated by the facial analysis module 212 does not match any of the stored face data 242a-242n, the audio source 60 may not be able to provide commands. If the user cannot be identified, the method 350 may move to the step 374. If the user can be identified (e.g., the signal FACE_DATA matches one of the user profiles 240a-240n), the method 350 may move to the step 366. In the step 366, the processor 116 may compare the audio command of the signal INSTR with the permissions 246a-246n associated with the identified user 240a-240n. Next, the method 350 may move to the decision step 368.

In the decision step 368, the processor 116 may determine whether the user 60 has permission to access the feature of the audio command. In an example, the received audio signal INSTR may correspond with the features of the commands 230. The processor 116 may apply rules defined by the permissions 246a-246n based on the identity of the speaker 60 to define the actions and/or responses to be performed by the apparatus 100. If the user does not have permission, the method 350 may move to the step 370. In the step 370, the processor 116 may not perform the response to the audio command INSTR. Next, the method 350 may move to the step 374.

In the decision step 368, if the user does have permission to access the feature of the audio command, the method 350 may move to the step 372. In the step 372, the processor 116 may enable the response to the audio command to be performed. Next, the method 350 may move to the step 374. The step 374 may end the method 350.

The apparatus 100 may operate in one or more modes of operation. One of the modes of operation may be a sleep mode (e.g., a power saving mode and/or low-powered mode). In the sleep mode, the apparatus 100 may operate with reduced functionality to conserve power. In an example, in the sleep mode, the video operations may not be performed. In another example, in the sleep mode, the functionality of the apparatus 100 may be limited to listening for the audio commands INSTR and/or capturing the video frames FRAMES_A-FRAMES_N (e.g., the video frames may not be encoded or analyzed and may be stored temporarily). One of the modes of operation of the apparatus 100 may be a command execution mode. In the command execution mode, the apparatus 100 may parse the received audio command, perform the video operations, determine the identity of the audio source 60 and/or perform responses to the audio commands. The command execution mode of operation may consume more power than the sleep mode of operation. In an example, detecting the keyword may cause the apparatus 100 to change from the sleep mode of operation to the command execution mode of operation.

Figure 9:
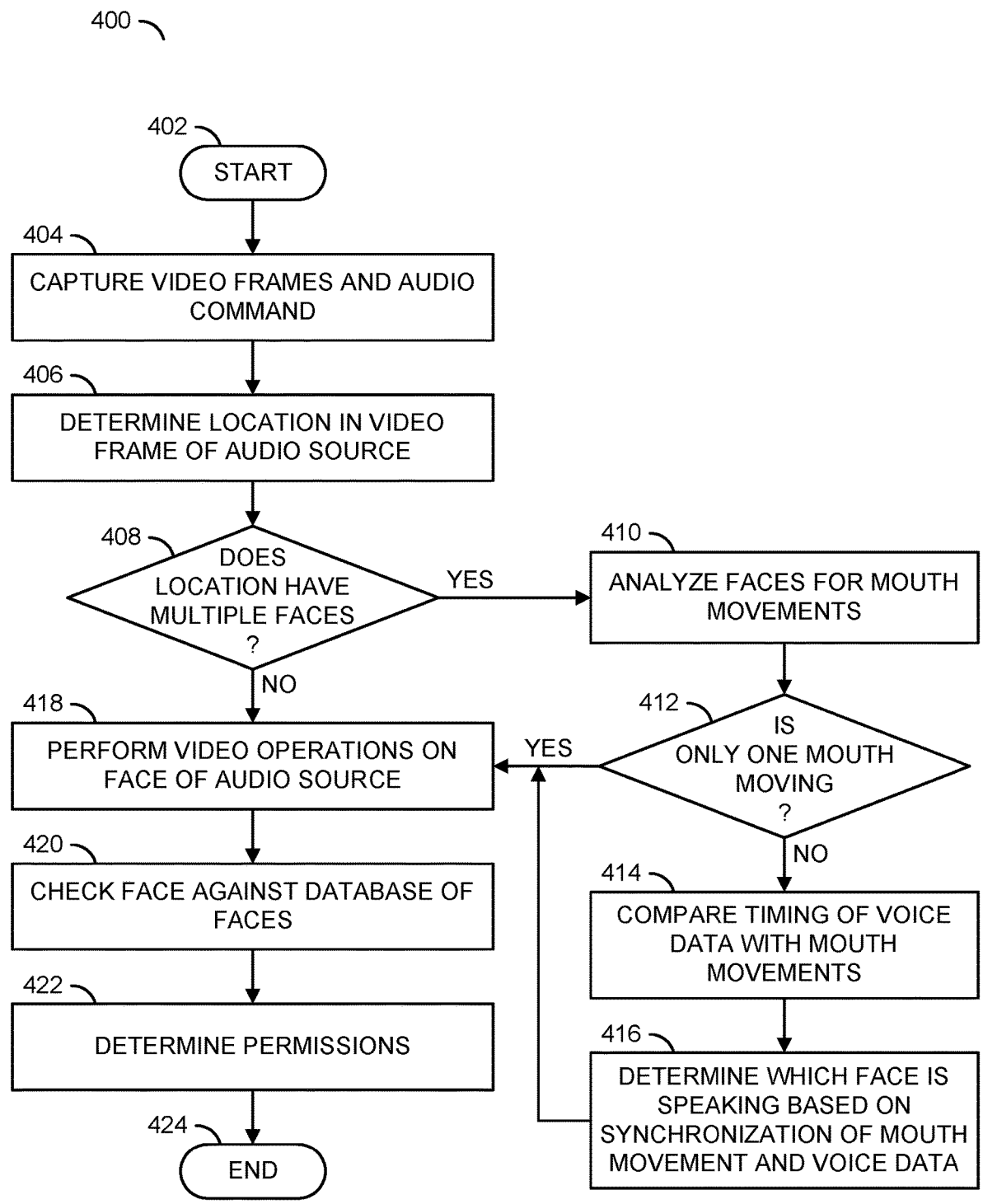
FIG. 9 is a flow diagram illustrating a method for selecting a speaker from a video frame with multiple faces.

Referring to FIG. 9, a method (or process) 400 is shown. The method 400 may select a speaker from a video frame with multiple faces. The method 400 generally comprises a step (or state) 402, a step (or state) 404, a step (or state) 406, a decision step (or state) 408, a step (or state) 410, a decision step (or state) 412, a step (or state) 414, a step (or state) 416, a step (or state) 418, a step (or state) 420, a step (or state) 422, and a step (or state) 424.

The step 402 may start the method 400. In the step 404, the apparatus 100 may capture the video frames FRAMES_A-FRAMES_N and/or the audio command INSTR. Next, in the step 406, the processor 106 may determine the location of the audio source 60 in the captured video frame (e.g., based on the information in the signal DIR_AUD). Next, the method 400 may move to the decision step 408.

In the decision step 408, the processor 116 may determine whether the location in the video frame 150 has multiple faces. If the location in the video frame 150 has multiple faces, the method 400 may move to the step 410. In the step 410, the processor 116 may analyze the faces for mouth movements. In some embodiments, the processor 116 may continue to use the directional audio information from the signal DIR_AUD to further refine the location. Next, the method 400 may move to the decision step 412.

In the decision step 412, the processor 116 may determine whether only one of the detected mouths in the location is moving. If more than one mouth is moving, the method 400 may move to the step 414. In the step 414, the processor 116 may compare the timing of the speech detected in the voice data with the movement of the detected mouths (e.g., perform sensor fusion operations based on audio/speech analysis and the video processing/object analysis). Next, in the step 416, the processor 116 may determine which face is speaking based on which of the mouths moving is synchronized with the speech patterns in the voice data. Next, the method 400 may move to the step 418.

In the decision step 412, if only one mouth is moving, the face with the moving mouth may be the audio source 60 and the method 400 may move to the step 418. In the decision step 408, if the location does not have multiple faces, the method 400 may move to the step 418.

In the step 418, the processor 116 may perform the video operations on the face 182 associated with the location of the audio source 60. Next, in the step 420, the processor 116 may check the detected face data (e.g., the signal FACE_DATA) against the stored face data 242a-242n. In the step 422, the processor 116 may determine the permissions 246a-246n for the identified user. Next, the method 400 may move to the step 424. The step 424 may end the method 400.

Figure 10:
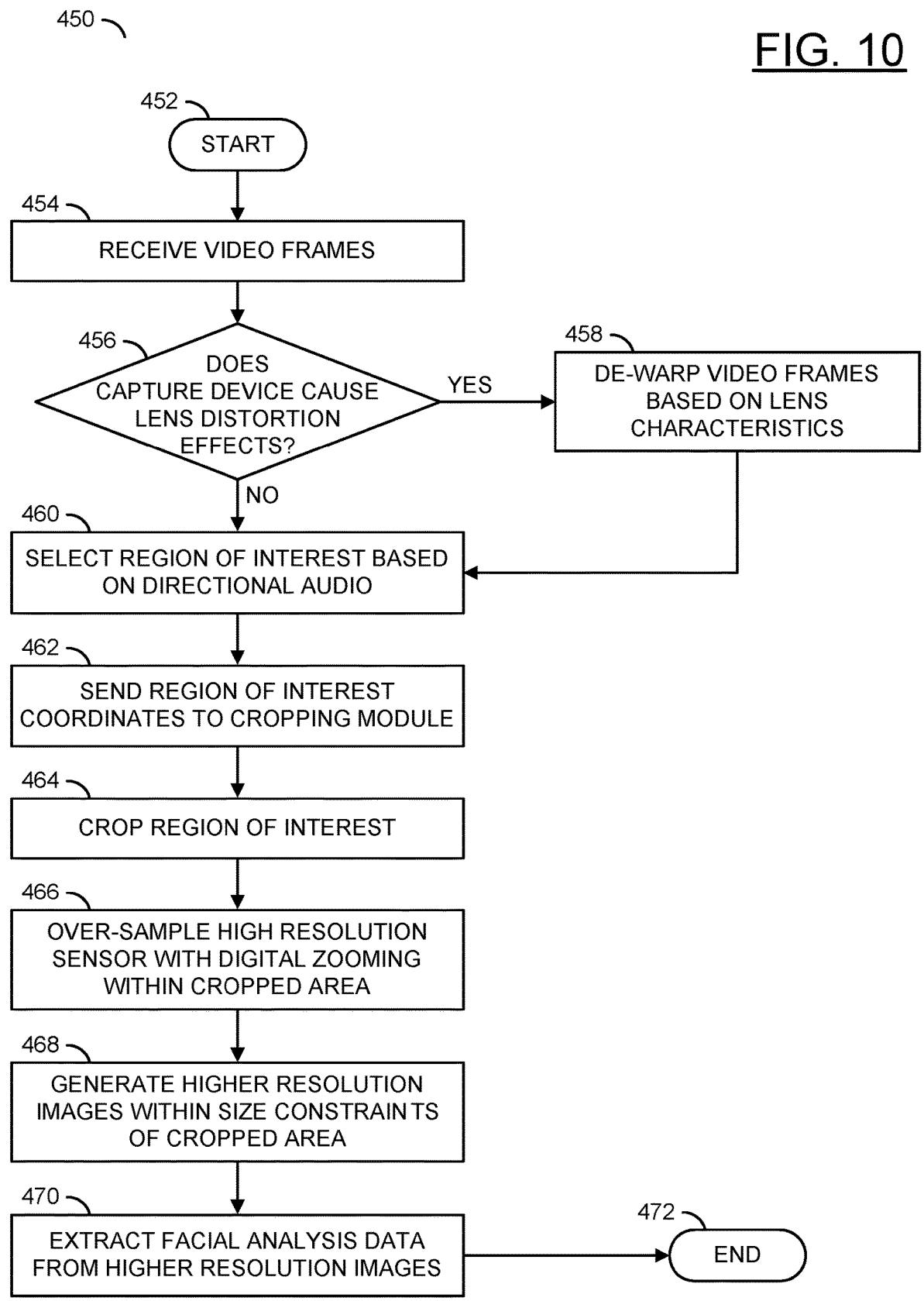
FIG. 10 is a flow diagram illustrating a method for performing video operations to extract a face.

Referring to FIG. 10, a method (or process) 450 is shown. The method 450 may perform video operations to extract a face. The method 450 generally comprises a step (or state) 452, a step (or state) 454, a decision step (or state) 456, a step (or state) 458, a step (or state) 460, a step (or state) 462, a step (or state) 464, a step (or state) 466, a step (or state) 468, a step (or state) 470, and a step (or state) 472.

The step 452 may start the method 450. In the step 454, the processor 116 may receive the video frames FRAMES_A-FRAMES_N. Next, the method 450 may move to the decision step 456.

In the decision step 456, the processor 116 may determine whether the capture devices 112a-112n cause lens distortion effects on the captured video frames (e.g., a fisheye distortion, a barrel distortion, etc.). In an example, the processor 116 may analyze the video frames and detect distortion. In another example, the processor 116 may have prior knowledge about the installed lenses 110a-110n (e.g., based on reading a hardware identifier of the capture devices 112a-112n and data stored in the memory 108). If the capture devices 112a-112n cause lens distortion effects, the method 450 may move to the step 458. In the step 458, the de-warping module 210 may de-warp the captured video frames based on the lens characteristics. Next, the method 450 may move to the step 460. In the decision step 456, if the capture devices 112a-112n do not cause lens distortion effects, the method 450 may move to the step 460.

In the step 460, the directional selection module 202 may select the region of interest 152 based on the directional audio signal DIR_AUD. Next, in the step 462, the directional selection module 202 may send coordinates corresponding to the region of interest 152 to the cropping module 204. In the step 464, the cropping module 204 may crop the region of interest 152 from the captured video frame 150. Next, the method 450 may move to the step 466.

In the step 466, the over-sampling module 206 may over-sample the high resolution sensors 140a-140n and the digital zooming module 208 may perform digital zooming on the cropped area 152. In some embodiments, the cropping module 204 may further crop the window of interest 152 as needed to perform the digital zoom on the face 182 of the audio source 60. Next, in the step 468, the over-sampling module 206 and/or the digital zooming module 208 may generate higher resolution images within the size constraints of the cropped area 152. In the step 470, the facial analysis module 212 may perform the facial recognition operation 184 to extract the facial analysis data (e.g., FACE_DATA) from the higher resolution images. Next, the method 450 may move to the step 472. The step 472 may end the method 450.

In some embodiments, the capture devices 112a-112n may be located at a same location as the microphones 120a-120n. In some embodiments, the microphones 120a-120n may be at one location (e.g., stationary) and the capture devices 112a-112n may be located at a different location (e.g., stationary). For example, having the capture devices 112a-112n at different locations than the microphones 120a-120n may enable cameras to be hidden and/or enable the audio command INSTR to be given by the audio source 60 without having to turn and face the camera system 100. In some embodiments, the microphones 120a-120n may be at one location (e.g., stationary) and the capture devices 112a-112n may be at variable locations (e.g., moving around a location, attached to a flying drone, attached to a camera track, attached to a camera crane, etc.). The apparatus 100 may be configured to correlate the location of the audio when captured with the location in the video frame at the time the video was captured to determine the location of the audio source in the captured video frame.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a video capture device configured to generate a plurality of video frames in an over-sampled format;
an audio capture device configured to capture audio; and
a processor configured to (i) analyze said audio to determine a direction of a source of said audio, (ii) determine a window of interest in said video frames by analyzing said video frames in said direction determined to be said source of said audio, (iii) perform video operations to generate a high resolution portion of images inside said window of interest and a low resolution portion of images outside of said window of interest, (iv) perform facial recognition operations on said high resolution portion of said images and (v) determine an identity of said source of said audio in response to said facial recognition operations, wherein (a) said window of interest has an area less than a total area of said video frames and (b) said identity of said source of said audio determines permissions for accessing features of said apparatus.

2. The apparatus according to claim 1, wherein said features are performed by said apparatus in response to verbal commands determined from said audio.

3. The apparatus according to claim 2, wherein said permissions are used to determine which of said features are available to said source of said audio.

4. The apparatus according to claim 1, wherein said video operations comprise (i) cropping said video frames to said window of interest and (ii) performing digital zooming within said window of interest.

5. The apparatus according to claim 4, wherein said video operations further comprise de-warping said video frames when said video capture device comprises a fisheye lens.

6. The apparatus according to claim 1, wherein determining said identity of said source of said audio comprises (a) using said facial recognition operations to determine a face of said source of said audio, (b) comparing said face against a database of facial information and (c) selecting said identity in response to a match of said face and said facial information in said database.

7. The apparatus according to claim 1, wherein said processor is further configured to monitor mouth movements in said video frames.

8. The apparatus according to claim 7, wherein said processor is further configured to distinguish between multiple sources of audio by combining said monitored mouth movements with said audio.

9. The apparatus according to claim 1, wherein said processor performs said facial recognition operations by implementing computer vision.

10. The apparatus according to claim 1, wherein said apparatus operates in a sleep mode to conserve power until a keyword is detected.

11. The apparatus according to claim 1, wherein (i) said video capture device comprises a plurality of capture devices each configured to generate said video frames and (ii) said processor is configured to perform video stitching operations on said video frames to generate panoramic video frame.

12. The apparatus according to claim 1, wherein (i) said video capture device comprises a wide angle lens and (ii) a field of view of said wide angle lens captures panoramic video frames.

13. The apparatus according to claim 1, wherein said audio capture device comprises one or more directional microphones configured to provide information corresponding to said direction of said source of said audio.

14. The apparatus according to claim 1, wherein one or more of said features is not performed if said source of said audio does not have said permissions for accessing said features.

15. The apparatus according to claim 1, wherein said apparatus is configured to implement a home monitoring camera featuring an intelligent personal audio assistant, smart zoom and face recognition features.

16. The apparatus according to claim 1, wherein said high resolution portion of said images and said low resolution portion of said images are blended into said images.

17. The apparatus according to claim 16, wherein said high resolution portion of said images are encoded using a first encoding rate and said low resolution portion of said images are encoded using a second encoding rate.

\* \* \* \* \*